INVENTOR.
GEORGE KELLER JR.
ATTORNEYS

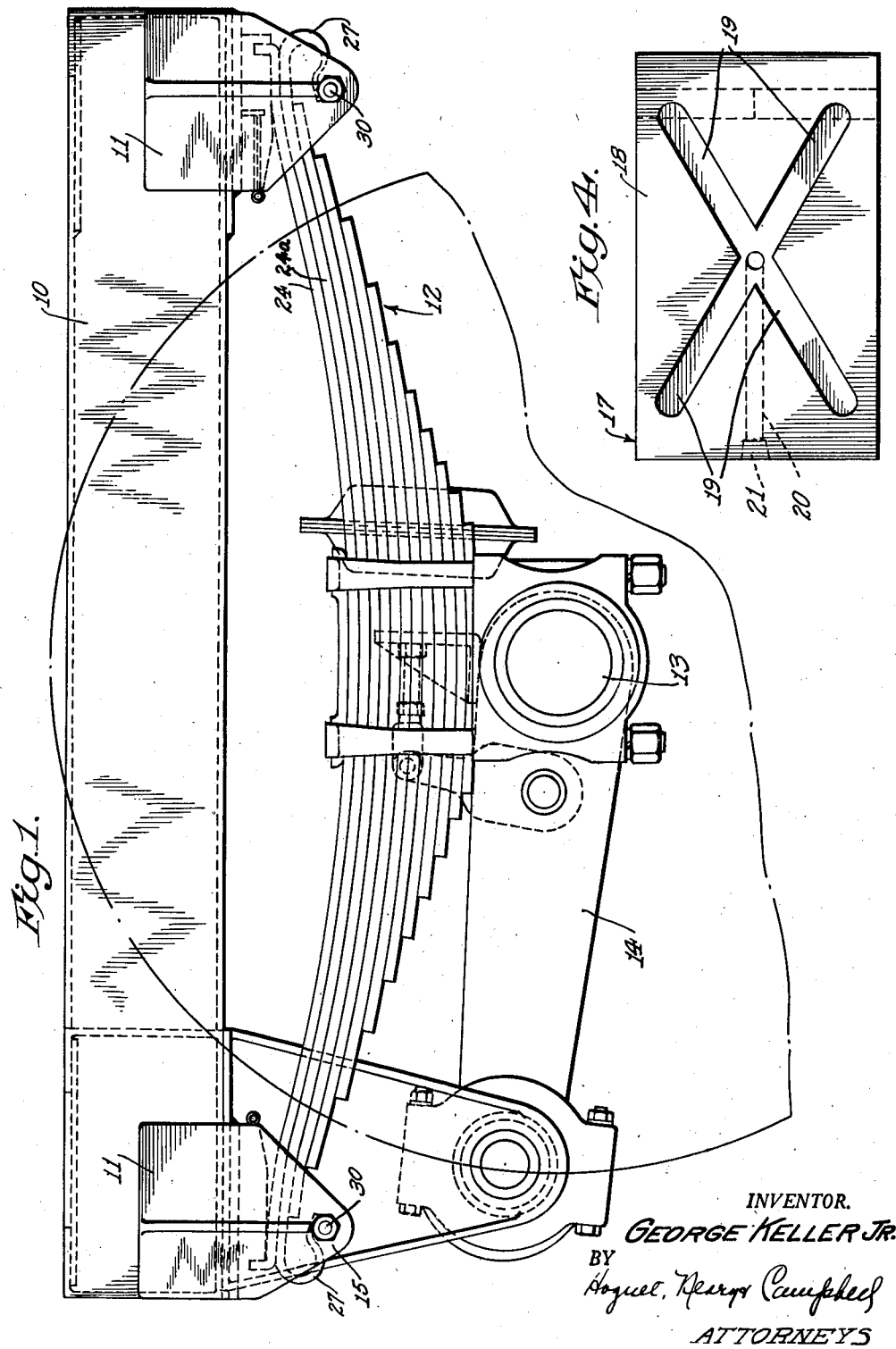

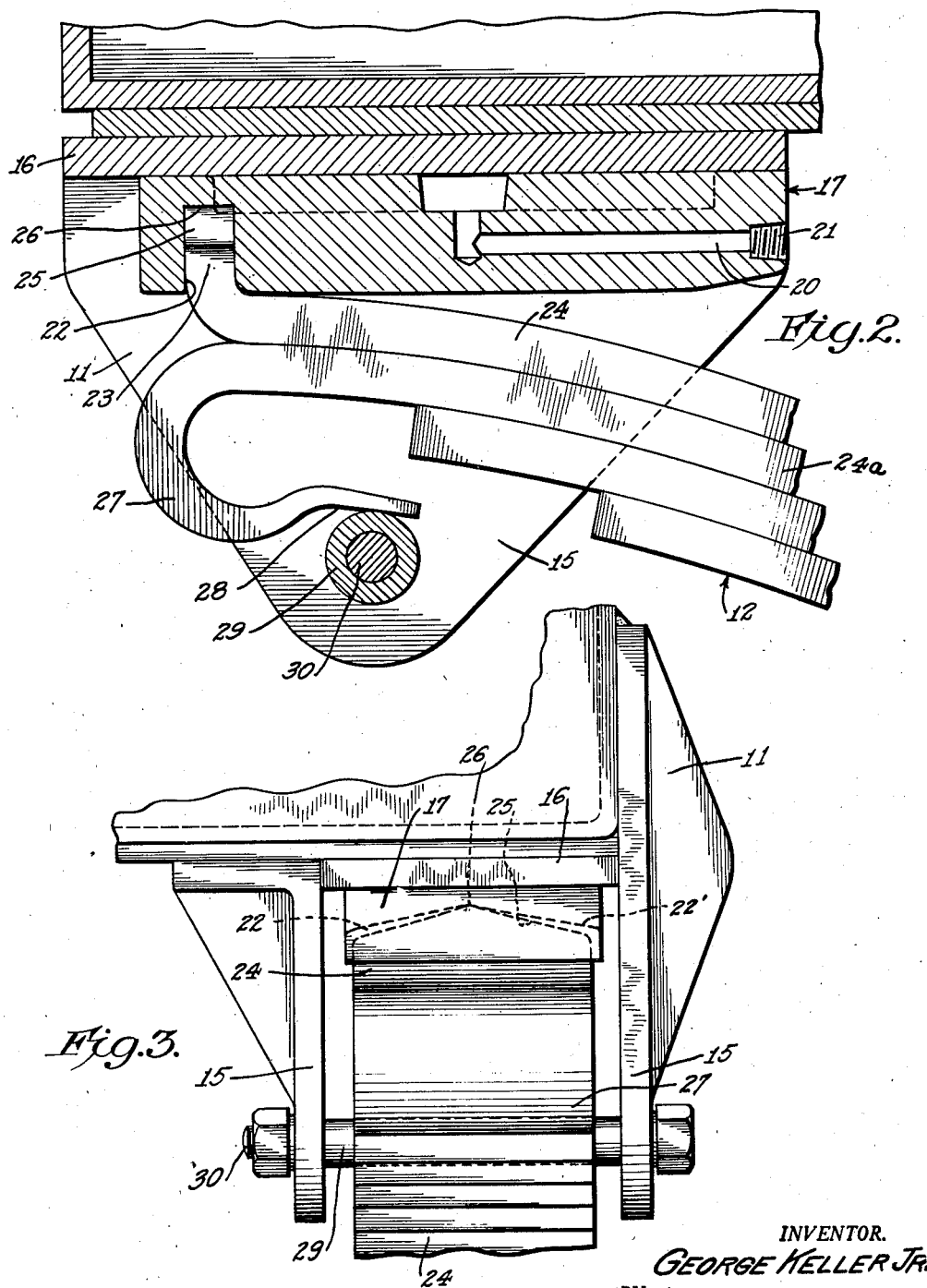

Patented Feb. 12, 1946

2,394,695

UNITED STATES PATENT OFFICE 2,394,695

SLIPPER SPRING BLOCK

George Keller, Jr., Keyport, N. J., assignor to The Trucktor Corporation, Newark, N. J., a corporation of Delaware Application December 15, 1943, Serial No. 514,347

6 Claims. (Cl. 267—56)

The present invention relates to spring suspensions for motor vehicles and embodies more specifically an improved connection between the spring and associated stationary member of the vehicle to which the spring is connected.

More particularly, the invention relates to motor vehicle spring mountings wherein the spring is connected to the vehicle in such fashion as to accomplish a progressive contact of the spring with the associated supporting elements during variations in the loading of the spring. The spring mountings of this general character have long been known, and the present invention seeks to provide improved structural features of mountings of such character, as well as improved mountings which do not utilize the progressive spring action, but which provide for a sliding contact between the spring and the vehicle frame in order to relieve the spring effectively from all forces except the gravitational forces which are intended to be carried by the spring.

An object of the invention, accordingly, is to provide an improved spring mounting of the above character wherein the spring is mounted in such fashion as to relieve it of forces other than gravitational forces for which the spring is designed.

A further object of the invention is to provide an improved spring connection wherein progressive action of the spring is accomplished effectively while providing structural advantages facilitating the manufacture and servicing of the mechanism and improving the operation of the spring during the life of the vehicle.

A further object of the invention is to provide a spring mounting of the above character wherein a sliding connection is provided between the spring and the vehicle, such connection effectively relieving the spring of all forces, save gravitational forces, and providing for effective lubrication of the relatively moving surfaces.

Further objects of the invention will be apparent as it is described in greater detail in connection with the accompanying drawings, wherein:

Figure 1 is a view in side elevation, partly broken away and in section, showing a spring connection constructed in accordance with the present invention;

Figure 2 is an enlarged detailed view of the spring connection and mounting shown in Figure 1;

Figure 3 is a view in end elevation looking from the left in Figure 2;

Figure 4 is a plan view of the slipper block shown in Figures 1, 2, and 3;

Figure 5:
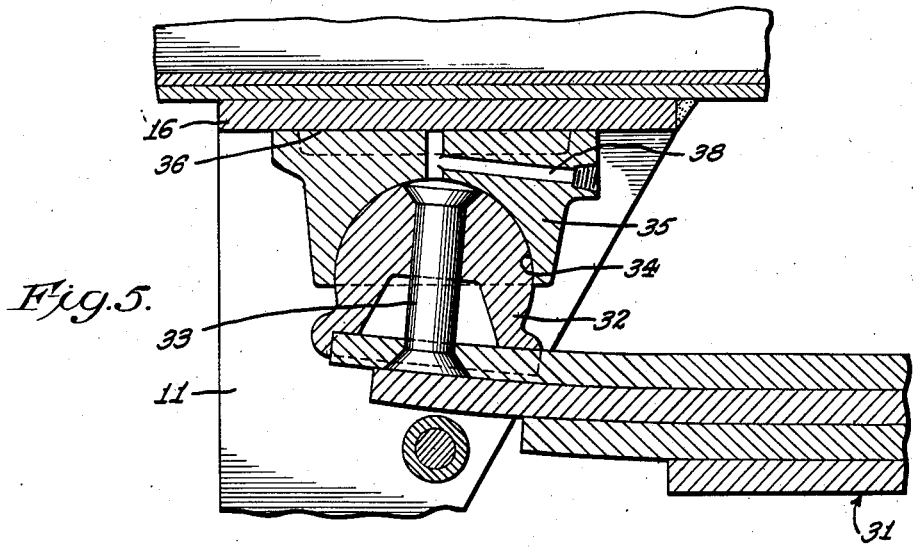
Figure 5 is a very similar view to Figure 2, showing a modified form of the invention.

With reference to the above drawings, the vehicle frame is illustrated at 10 and is provided with brackets 11 spaced in such fashion that they may receive the ends of spring 12. The spring is secured to an axle 13, which may be mounted upon the vehicle frame in any suitable fashion and maintained in spaced relationship with respect thereto by means of a radius rod or other connection 14. The foregoing elements are conventional and need not be further described.

In accordance with the present invention, the brackets 11 are formed with downwardly extending and spaced flanges 15, a wear plate or a surface 16 being provided in the brackets to engage a slipper block 17, which is shown in detail in Figures 2, 3, and 4.

The slipper block is formed with a flat surface 18, which is adapted to engage against the surface 16 and slide thereover to accommodate elongation of the spring 12. Lubrication of the surfaces 16 and 18 is accomplished by means of channels 19 which receive lubricant through ducts 20 from an opening 21 in which a suitable fitting may be secured.

The slipper blocks 17 are provided with a transverse groove 22 to receive a flange 23 formed upon the adjacent end of the upper leaf 24 of the spring 12. The bottom of the groove 22 is formed with a tapered surface 22', as illustrated in Figure 3. The flange 23 extends upwardly and terminates in tapered surfaces 25 terminating in an edge 26, which engages the central portion of the tapered surface 22' at the bottom of the groove 22. The clearance between the lower surface of the slipper block 17 and the upper surface of the spring leaf 24 permits rocking of the spring upon a longitudinal axis and about the edge 26 as a center, thus to accommodate twisting of the spring with respect to the frame due to unequal vertical movement between the wheels on opposite sides of the vehicle.

The second leaf 24a of the spring 12 is formed with a downwardly curved extension 27 having a pressure surface or arm 28 which is adapted to engage a bushing 29 carried by a through-bolt 30 which is connected between the plates 15 of the bracket 11. The arm 28 thus maintains some tension on the slipper block 17 at all times and prevents the flange 23 from leaving the groove 22 under extreme spring deflections. If desired, the arm 28 can be omitted and the length of the flange 23 and position of the bolt 30 may be such as to prevent the flange from leaving the groove.

It is to be observed that, during operation, and under varying loads, the connection between the spring 12 and the slipper 17 is such that a progressive spring action is accomplished, the upper surface of the leaf 24 rolling on the under-surface of the slipper block 17, this action being accomplished by virtue of the shortening of the active length of the spring itself under deflection.

The foregoing mechanism will be seen to relieve the spring of all sliding contact and of all loads except the gravitational load, the slipper block 17 assuming all sliding contact and under conditions in which adequate lubrication may be provided. The spring end is thus mounted with a rolling contact under all conditions.

Figure 6:
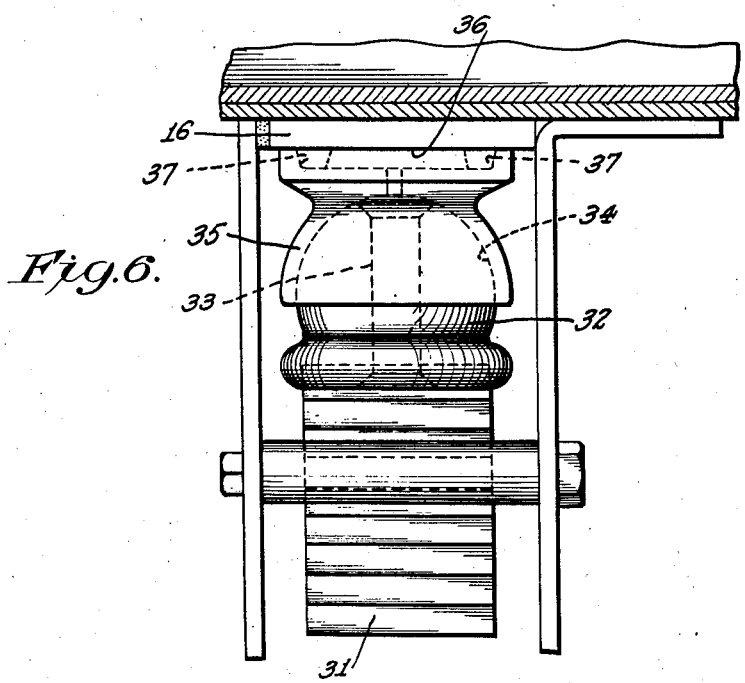
Figure 6 is a view in end elevation taken from the left in Figure 5, and showing the details of the modified spring connection.

Referring to the structure shown in Figures 5 and 6, a spring 31 is provided with a spherical block 32, suitably secured thereto as by means of a rivet 33, and being received within a spherical recess 34 formed in a slipper block 35. The block 35 is formed with a sliding surface 36 adapted to engage the surface 16 on the bracket 11, lubrication being provided by channels 37 and ducts 38 similar to the corresponding elements in the construction shown in Figures 1, 2, 3 and 4.

The mechanism shown in Figure 5 thus provides a slipper block which assumes all of the wear due to sliding motion resulting from the elongation of the spring and, at the same time, provides a connection which relieves the spring of all twisting and other forces, save the gravitational load of the vehicle.

While the invention has been described specifically with reference to the structure shown in the accompanying drawings, it must not be limited save as defined in the appended claims.

I claim:

1. A spring connection for a motor vehicle, comprising a leaf spring having a plurality of spring leaves and frame means upon which the spring is mounted, a slipper block mounted slidably on the frame member, a groove in the block, a flange formed on one of the spring leaves and engaging the groove, another spring leaf having a reversely curved resilient end directed away from said flange, and means on said frame engaging said reversely curved end for retaining said flange in said groove.

2. A spring connection for a motor vehicle, comprising a spring and frame means upon which the spring is mounted, a slipper block mounted slidably on the frame member, an extended engaging surface on the block adapted to be progressively engaged by the spring, a groove in the block at one end of the engaging surface, and a flange on the spring engaging the groove, said flange being formed with a pivot edge lying in a plane substantially parallel to the spring, extending longitudinally thereof and adapted to engage the bottom of the groove.

3. A spring connection for a motor vehicle, comprising a spring and frame means upon which the spring is mounted, a slipper block mounted slidably on the frame member, an extended engaging surface on the block adapted to be progressively engaged by the spring, a groove in the block at one end of the engaging surface, a flange on the spring engaging the groove, said flange being formed with a pivot edge lying in a plane substantially parallel to the spring, extending longitudinally thereof and adapted to engage the bottom of the groove, and means on said spring and said frame resiliently urging said flange into said groove to prevent disengagement of the flange and groove.

4. A spring connection for a motor vehicle, comprising a spring and frame means upon which the spring is mounted, a slipper block mounted slidably on the frame member, an extended engaging surface on the block adapted to be progressively engaged by the spring, a groove in the block at one end of the engaging surface and formed with tapering bottom surfaces, and a flange on the spring having tapering surfaces forming an edge lying in a plane substantially parallel to the spring and adapted to engage the bottom of the groove at the intersection of the tapered surfaces thereof.

5. A spring connection for a motor vehicle, comprising a spring and frame means upon which the spring is mounted, a slipper block mounted slidably on the frame member, an extended engaging surface on the block adapted to be progressively engaged by the spring, a groove in the block at one end of the engaging surface and formed with tapering bottom surfaces, a flange on the spring having tapering surfaces forming an edge lying in a plane substantially parallel to the spring and adapted to engage the bottom of the groove at the intersection of the tapered surfaces thereof, plates spaced on opposite sides of the frame means, and a bolt extending therebetween to prevent disengagement of the flange and groove.

6. A spring connection for a motor vehicle, comprising a spring and frame means upon which the spring is mounted, a slipper block mounted slidably on the frame member, an extended engaging surface on the block adapted to be progressively engaged by the spring, a groove in the block at one end of the engaging surface and formed with tapering bottom surfaces, a flange on the spring having tapering surfaces forming an edge lying in a plane substantially parallel to the spring and adapted to engage the bottom of the groove at the intersection of the tapered surfaces thereof, plates spaced on opposite sides of the frame means, a bolt extending therebetween to prevent disengagement of the flange and groove, and means on the spring to engage the bolt yieldingly.

GEORGE KELLER, Jr.